United States Patent
Cullen et al.

(10) Patent No.: US 9,069,614 B2
(45) Date of Patent: *Jun. 30, 2015

(54) USING A TEMPORARY OBJECT HANDLE TO CONTROL ACCESS TO A RESOURCE OBJECT

(75) Inventors: Paul Cullen, Hursley (GB); Andrew Hickson, Hursley (GB); Gary Longerstaey, Winchester (GB); Stuart Reece, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,232

(22) Filed: Sep. 15, 2012

(65) Prior Publication Data

US 2013/0019247 A1     Jan. 17, 2013

Related U.S. Application Data

(63) Continuation of application No. 12/875,650, filed on Sep. 3, 2010.

(30) Foreign Application Priority Data

Sep. 3, 2009   (GB) .................................. 09169343.2

(51) Int. Cl.
  *G06F 9/46* (2006.01)
  *G06F 12/00* (2006.01)
  *G06F 9/50* (2006.01)

(52) U.S. Cl.
  CPC .................................... *G06F 9/5011* (2013.01)

(58) Field of Classification Search
  None
  See application file for complete search history.

(56) References Cited

U.S. PATENT DOCUMENTS

| | | | |
|---|---|---|---|
| 7,080,177 B2* | 7/2006 | Neuman ........................ | 710/240 |
| 7,233,946 B1* | 6/2007 | McPolin ............................... | 1/1 |
| 7,752,283 B2* | 7/2010 | Bieber .......................... | 709/219 |
| 7,827,192 B2* | 11/2010 | Batterywala .................. | 707/781 |
| 2005/0144401 A1* | 6/2005 | Pantalone et al. ............. | 711/151 |
| 2005/0149481 A1* | 7/2005 | Hesselink et al. ................ | 707/1 |
| 2005/0246505 A1* | 11/2005 | McKenney et al. ........... | 711/151 |
| 2005/0266926 A1* | 12/2005 | Kesselman et al. ............. | 463/42 |
| 2006/0112216 A1* | 5/2006 | Bashford et al. .............. | 711/105 |
| 2006/0136369 A1* | 6/2006 | Douceur et al. .................. | 707/2 |
| 2007/0067595 A1* | 3/2007 | Ghose ........................... | 711/167 |
| 2008/0294598 A1* | 11/2008 | Imai .................................. | 707/2 |
| 2009/0019079 A1* | 1/2009 | Persson ..................... | 707/103 R |
| 2009/0132552 A1* | 5/2009 | Adya et al. ....................... | 707/10 |
| 2009/0320033 A1* | 12/2009 | Gokhale et al. ............... | 718/103 |
| 2010/0192227 A1* | 7/2010 | Dai et al. ......................... | 726/24 |
| 2011/0314475 A1* | 12/2011 | Allen et al. .................... | 718/103 |

OTHER PUBLICATIONS

U.S. Appl. No. 12/875,650 entitled "Method and System Using a Temporary Object Handle"; Non-final office action dated Oct. 5, 2012 (20 pg.).

* cited by examiner

*Primary Examiner* — Tammy Lee
(74) *Attorney, Agent, or Firm* — Yudell Isidore PLLC; David Mims

(57) ABSTRACT

A method is provided for using a temporary object handle. The method performed at a resource manager includes: receiving an open temporary handle request from an application for a resource object, wherein a temporary handle can by asynchronously invalidated by the resource manager at any time; and creating a handle control block at the resource manager for the object, including an indication that the handle is a temporary handle. The method then includes: responsive to receiving a request from an application to use a handle, which has been invalidated by the resource manager, sending a response to the application that the handle is invalidated.

20 Claims, 5 Drawing Sheets

USING A TEMPORARY OBJECT HANDLE TO CONTROL ACCESS TO A RESOURCE OBJECT

PRIORITY CLAIM

The present application is a continuation of and claims priority from U.S. patent application Ser. No. 12/875,650, filed on Sep. 3, 2010, titled "Method and System Using a Temporary Object Handle, claims benefit of priority under 35 USC §120 and §365 to the previously filed Great Britain Patent Application No. 09169343.2 entitled, "Method and System Using a Temporary Object Handle" with a priority date of Sep. 3, 2009. The content of both applications are incorporated by reference herein.

FIELD OF THE INVENTION

The invention relates to the field of computer resource management. In particular, the invention relates to a computer implemented method of managing resources using a temporary object handle.

BACKGROUND

When an application opens a queue, the application is given a handle through which the application can access the queue. The presence of an open handle can inhibit certain operations. For example, it is not possible to purge a WebSphere MQ queue (WebSphere® and MQ are trade marks of International Business Machines Corporation of Armonk N.Y.) while a handle is open against that queue. Applications which open queues are typically responsible for closing those queues in a timely manner in order to keep the system functioning normally. For example, when an application has a handle open against a queue, then more of the queue (for example an index) may be stored or cached in memory.

It is common for existing resource managers to follow one of two patterns with respect to requests that conflict with a pre-existing open handle on an object: (1) To fail the conflicting request (this is the most common implementation); or (2) To allow the conflicting request to complete and to redirect the existing handle to a null object (for example, /dev/null). For example, a UNIX file handle (UNIX is a trade mark of The Open Group) represents an open file and when the file can be deleted while the file is open, no notification of the deletion is given to the application.

In another example, on Windows Operating System (Windows is a trade mark of Microsoft Corporation), an application opening a file can select whether the file is locked against deletion at open time (via the FILE_SHARE_DELETE option), however again no indication is given to the owner of the file handle when the file is deleted while the file is open.

SUMMARY

According to a first aspect of the present invention, there is provided a method for using a temporary object handle at a resource manager, comprising: receiving an open temporary handle request from an application for a resource object, wherein a temporary handle can be asynchronously invalidated by the resource manager at any time; and allocating a handle control block at the resource manager for the object including an indication that the handle is a temporary handle.

According to a second aspect of the present invention there is provided a method for using a temporary object handle by an application, comprising: an application requesting a temporary handle to be opened on a resource object, wherein the temporary handle is subject to being asynchronously invalidated by a resource manager at any time; and indicating that a handle open on the resource object is a temporary handle.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

Figure 1:
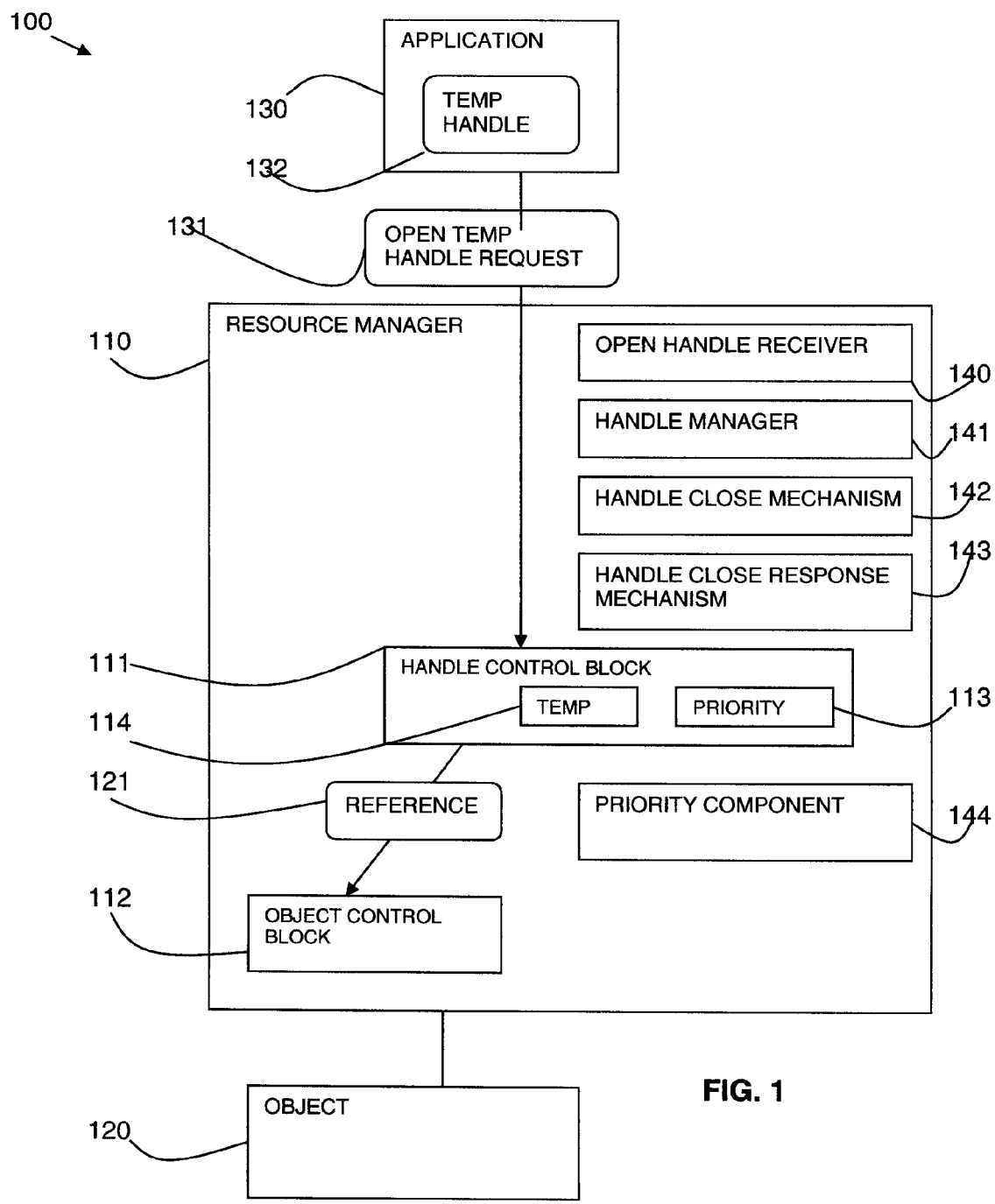
FIG. 1 is a block diagram of a system of using a temporary object handle in accordance with the present invention.

The described method and system provide an option to allow a temporary handle to be opened on an object. The request to open the handle indicates that a temporary handle is required and the handle is then subject to asynchronously being made invalid at any time the resource manager that allocated the handle so chooses.

In indicating that a temporary handle is required, the application opening the handle has agreed to being able to cope with a subsequent response from the resource manager indicating that the handle has been asynchronously invalidated. Any application requesting a temporary handle should have been designed to cope with such a response. Typically, upon receiving such a response the application would attempt to open a new handle on the same object.

The described method and system could be further extended by providing a priority attribute on the request that opens the handle. This priority could then be used to determine which conflicting requests should be allowed to proceed that result in the temporary handle being invalidated. For example, the priority attribute could range from 0-9, with 9 being highest. If an application A is using the handle with priority 5, and application B requests the handle with priority 6 or more, then the resource manager would invalidate the handle for application A in order to allow application B to use it. However, if application B requests the handle with priority 5 or less, then the request by application B to open the object would be rejected. If multiple cooperating applications each have a handle open on the same object (i.e. these are non-conflicting), and a further application makes a conflicting request at a higher priority, then all of the conflicting handles are invalidated and those applications are notified when they make their next request to the resource manager using their handle.

A handle is used when an application references blocks of memory or objects managed by another system, such as a database or an operating system. A handle is an opaque reference that identifies a resource. An example would be a Unix file handle. This identifies an open file and associated data such as whether the file was opened for read or write.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Referring to FIG. 1, a block diagram shows the described system 100. The system 100 includes a resource manager 110 with a resource object 120 which the resource manager 110 manages. An application 130 requiring access to the resource object 120 issues a request 131 to open a handle for an object 120 to the resource manager 110. The application 130 specifies in its request 131 that it wants to open a temporary handle for the object 120. A temporary handle 132 is defined as a handle that is opened but which the resource manager 110 is allowed to invalidate or close. The application 130 copes with such invalidation of the handle by opening a new handle 132, if required, upon discovering that the handle is invalidated.

The resource manager 110 includes an open handle request receiver 140 for receiving requests from applications 130 and a handle manager 141 for managing control blocks or files at the resource manager 110. The resource manager 110 also includes a handle closing mechanism 142 and a handle closed response mechanism 143. The resource manager 110 contains multiple handle control blocks or files 111, each representing the open handles 132 for objects 120. A handle control block 111 is extended 114 to indicate whether a handle is opened as a temporary handle. The handle control block 111 references 121 an object control block or file 112 representing the object 120 itself. This provides a level of indirection as a reference to an object, rather than the object 120 itself.

When a handle control block 111 for a temporary handle 132 is implicitly closed by the resource manager 110, the handle control block 111 of the temporary handle 132 is flagged as closed and de-referenced from the object control block 112. The handle control block 111 remains on the resource manager 110 with a closed flag, so that subsequent attempted access by an application 130 receives a returned response that the handle is closed.

When the handle control block 111 is next referenced via the application handle 132, the application 130 is notified by the handle close response mechanism 143 that the handle control block 111 has been implicitly invalidated. The typical application action upon receiving this response would be to close the application handle 132, which would cause the handle control block 111 to be deleted.

In one embodiment of the described system, there may also be a connection control block. A connection may have a number of open handles associated with it, each of which refers to an object control block 112. A connection control block also references the handles associated with that connection. When a handle control block 111 is invalidated, the block 111 will remain referenced by the connection control block.

Optionally, the resource manager 110 may include a priority component 144 for evaluating the priority of requests to open a temporary handle on a resource object 120. The handle control block 111 may include an indication of the priority 113 of the current temporary handle on a resource object 120.

The open temporary handle request has a priority attribute and the resource manager invalidates any existing temporary handle on the resource object with a lower priority attribute to allow the higher priority request.

Figure 2:
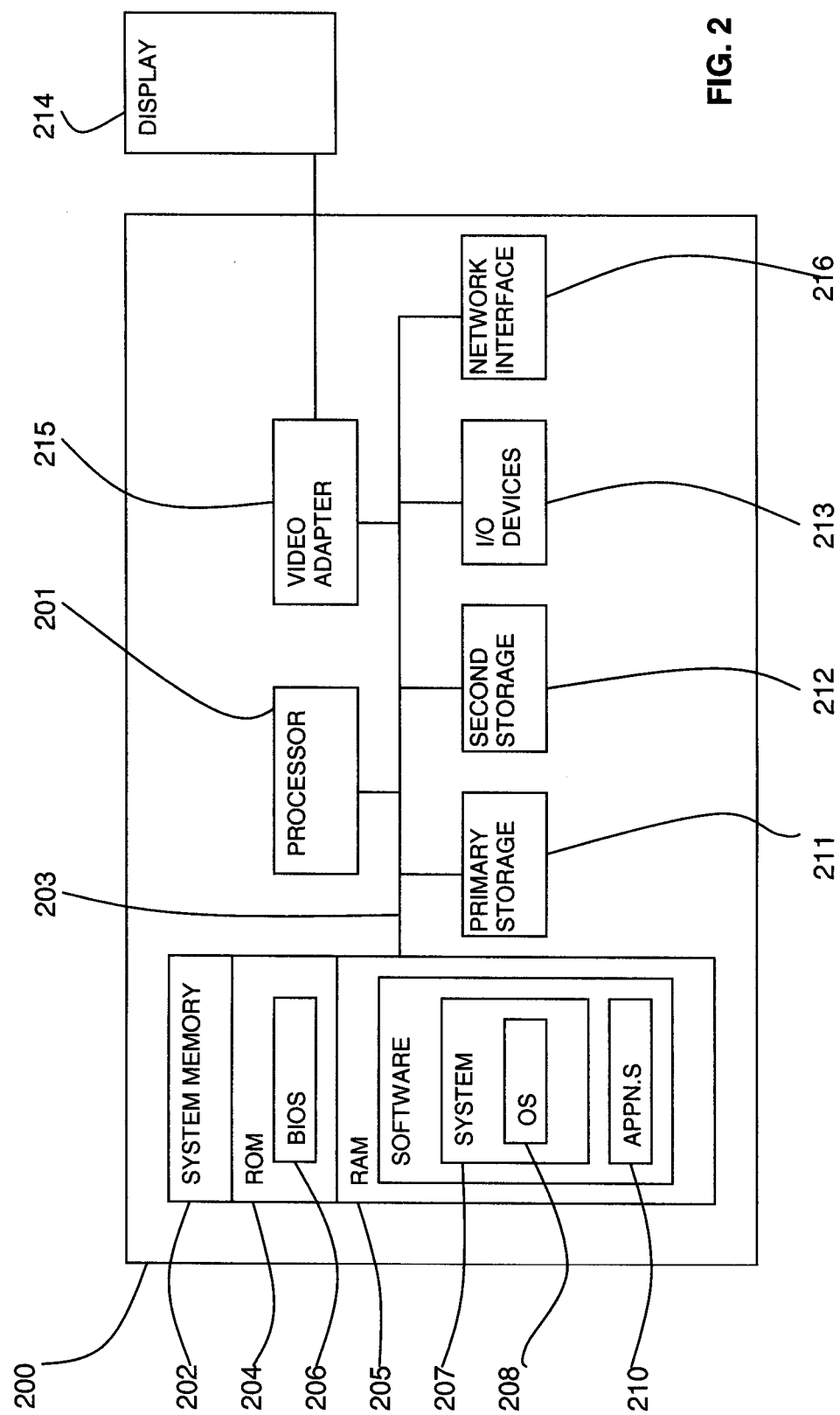
FIG. 2 is a block diagram of a computer system in which the present invention may be implemented.

Referring to FIG. 2, an exemplary system for implementing the described system includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
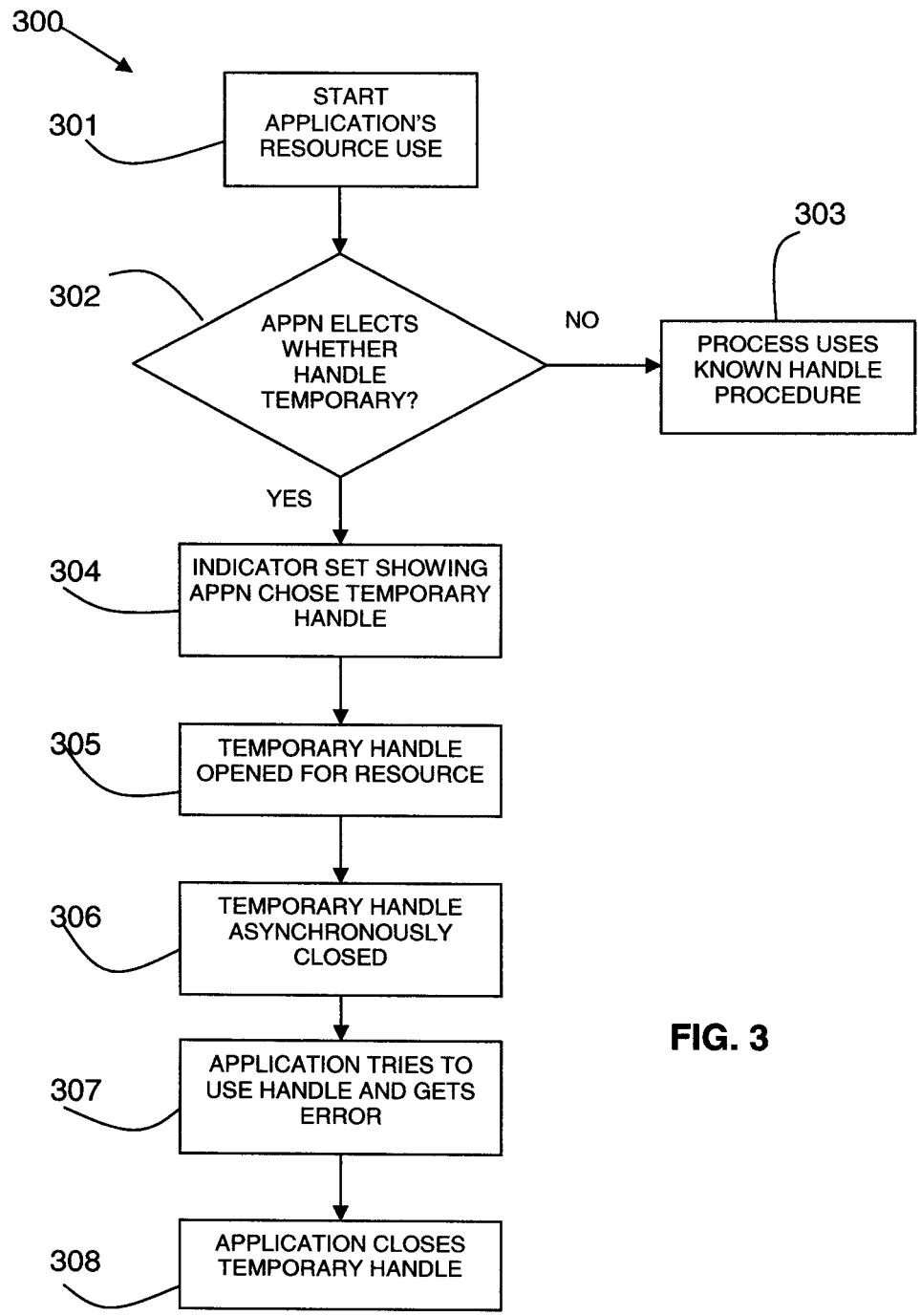
FIG. 3 is a flow diagram of a method in accordance with an aspect of the present invention.

Referring to FIG. 3, a flow diagram 300 shows the described method from an application perspective. A process starts 301 for an application's resource use. The application elects 302 whether it wishes the handle to be temporary or not. If the answer is no, then the described temporary handle cannot be used and the process continues 303 using known handle procedure.

If the answer is yes, then an indicator is set 304 showing that the application has chosen a temporary handle. The application opens 305 a temporary handle for the resource object. The temporary handle may be asynchronously closed or invalidated 306 by the resource manager while the application is connected. The application may then try to use the handle and gets 307 an error response. The application closes 308 the temporary handle. The application may now attempt to open a new handle on the object.

Figure 4:
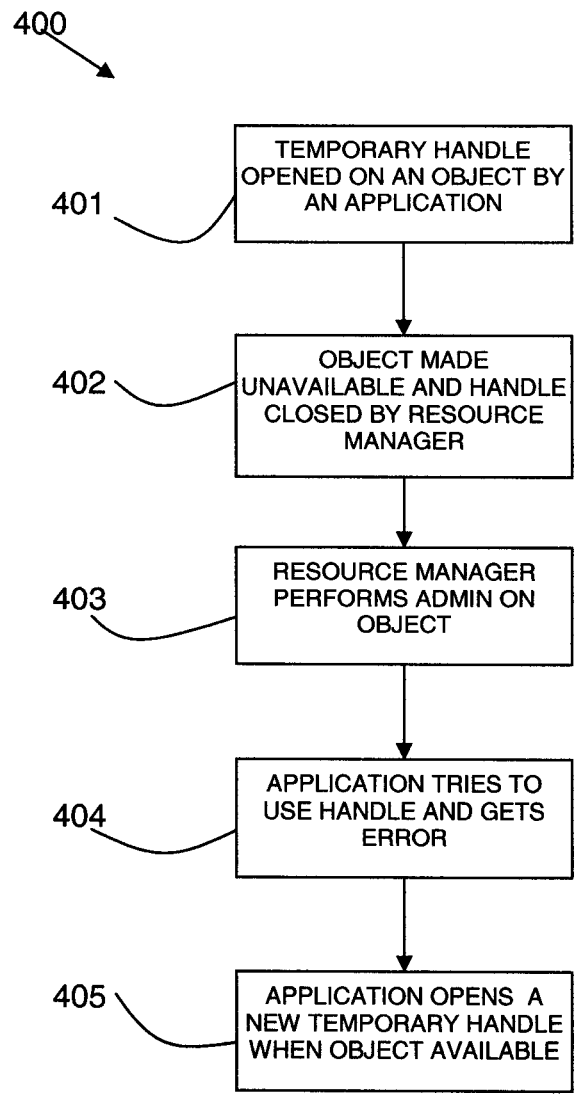
FIG. 4 is a flow diagram of a method in accordance with an aspect of the present invention.

Referring to FIG. 4, a flow diagram 400 shows the described method from a resource object perspective. A temporary handle is opened 401 by an application on the object. The object's resource manager chooses to make the object unavailable and closes 402 the handle. The resource manager performs administration 403 on the object. The application may try to reference 404 the object via the handle and will receive an error response. The application can open a new handle 405 when the resource becomes available.

Figure 5:
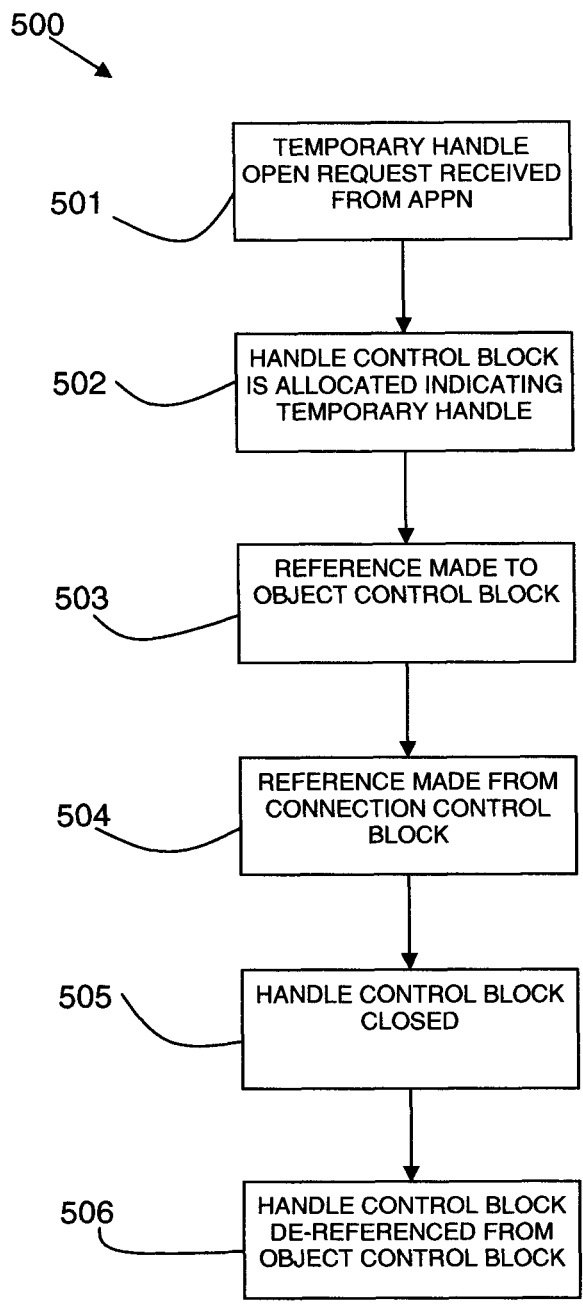
FIG. 5 is a flow diagram of a method in accordance with an aspect of the present invention.

Referring to FIG. 5, a flow diagram 500 shows further details of the described method from a resource object perspective. A temporary handle request is received 501 from an application. A handle control block is allocated 502 indicating that the handle is temporary. A reference is made 503 to an object control block, and a reference is made 504 from a connection control block. At some point, the resource manager may indicate that the handle control block is closed or invalidated 505 (for example, by flagging the handle control block). The handle control block is de-referenced 506 from the object control block.

Examples of the described temporary handle are now provided. The first example is in a Windows operating system environment. As an example, it is supposed that the Windows CreateFile service is extended to allow a new option FILE_SHARE_TEMPORARY_HANDLE.

Prior to this extension then the following behaviours might be seen:

| Process 1 | Process 2 |
|---|---|
| BOOL bSuccess=TRUE;<br>CreateFile ("temp1"<br>  ,FILE_SHARE_DELETE<br>  ,...);<br>while( bSuccess )<br>{<br>  SetFilePosition(...0, FILE_BEGIN);<br>  bSuccess = WriteFile( "hello world" ...)<br>} | |
| | del temp1 /* This receives a success response code due to the use of FILE_SHARE_DELETE */<br>CreateFile("temp1<br>  ,...)<br>!!! FAILURE !!! /* An open handle still exists on "temp1" */<br>/* This request will not succeed until the handle opened by process 1 has been closed */ |

After the described extension and the addition of FILE_SHARE_TEMPORARY_HANDLE to the CreateFile request, then when the "del temp1" command is issued, the handle opened by Process 1 will be marked as invalid. When Process 1 makes the next call that references that handle, the request will be returned with an error code similar to "TEMPORARY_HANDLE_INVALIDATED". Process 1 would then have to decide how to react to this situation. The remaining state related to the original handle is completely private to Process 1 and an attempt by Process 2 to recreate the same object should now succeed.

Similarly, an example is given in UNIX. The same general flow prior to the use of the temporary handle would give the following sequence on UNIX:

| Process 1 | Process 2 |
|---|---|
| open("temp1", O_CREAT, ... )<br>while( TRUE )<br>{<br>    lseek(,,,, 0, SEEK_SET);<br>    if( error)<br>      break;<br>    write(....)<br>    if (error) | |
|     break;<br>} | |
| | rm temp1<br>open("temp1, O_CREAT...) |

In this case then, prior to the invention, the open in Process 2 would succeed; However, Process 1 would have no knowledge that its file had been redirected to /dev/null.

If the extension of the temporary handle were implemented, then the open in Process 1 would specify a new flag on the open (e.g. O_TEMP) and this would result in the lseek and the write (whichever first occurred after the rm command by Process 2) failing with errno set to an appropriate value to indicate that the file handle had been invalidated.

A further example is described in the WebSphere MQ messaging environment. An option MQOO_OPEN_TEMPORARY is provided which indicates that an application can cope with the queue being closed at any time of a queue manager's choosing. If a queue manager chooses to close a queue while a temporary handle is open against that queue, then the next time the temporary handle is used the application will be returned a MQRC_TEMPORARY_HANDLE_INVALIDATED return code. Typically, the application would attempt to reopen the queue upon receiving this return code and then repeat the previously failed operation.

Many applications manage a cache of queues (typically to avoid the overheads associated with using an MQPUT1). These applications then become responsible for managing the cache of open handles in a manner that does not impact the rest of the system, for example to prevent excessive storage utilization, or to avoid inhibiting operational procedures (for example purging a queue). The MQOO_OPEN_TEMPORARY option allows these applications to be considerably simplified and for responsibility for managing the cache of open handles to move from the application to the queue manager.

The queue manager already has a control block representing an open handle to a queue, this control block would be extended to indicate whether a handle was opened as a temporary handle. These handles are currently chained off another control block representing the queue itself, and also chained off a control block representing the connection with which the handle is associated. When a temporary handle is implicitly closed by the queue manager then the temporary handles are flagged as closed and unchained from the queue control block, but remain chained to the connection control block. When the handle is next used, the application is notified that the handle has been invalidated, and the control block representing the open handle is not released until the application explicitly closes the handle.

This protocol is fundamentally different from locking (a temporary lock would not be a useful concept, unlike a temporary handle to a lock). In order to implement a similar protocol using locking, an application suite would have to manage shared state, and serialization of the shared state would then require locking. The resource manager would also have to allow all conflicting requests to proceed, thus allowing policing of the conflicting requests to be carried out in the application layer. The scope of the shared state, and of the lock manager would have to match the scope of the resource manager (i.e. in the case of MQ, or any resource manager with a remote access capability, a distributed lock manager and state shared across multiple hosts).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A computer implemented method for using a temporary object handle at a resource manager, comprising:
    receiving an open temporary object handle request for a handle from an application for a resource object, wherein the handle is an opaque reference that identifies the resource object;
    opening the handle for the resource object;
    allocating a handle control block at the resource manager for the resource object, wherein the handle control block includes an indication that the handle is a temporary object handle that can be asynchronously invalidated by the resource manager at any time;
    receiving, from the application, a request to use the handle after the handle has been invalidated by the resource manager;
    in response to receiving the request from the application to use the handle after the handle has been invalidated, sending a response to the request from the application that indicates to the application that the handle has been invalidated; and
    in response to receiving the response from the resource manager that indicates the handle has been invalidated, the application issuing a new request to the resource manager for a second handle to be opened on the resource object.

2. The method as claimed in claim 1, further comprising referencing the handle control block to an object control block, wherein the object control block represents an indirect reference to the resource object.

3. The method as claimed in claim 1, further comprising:
    the resource manager asynchronously invalidating the handle by flagging the handle control block as closed.

4. The method as claimed in claim 3, further comprising de-referencing the handle control block from the object control block.

5. The method as claimed in claim 1, wherein the open temporary object handle request includes a priority attribute, the method further comprising:
    the resource manager invalidating any other existing open temporary object handle(s) on the resource object having an associated priority attribute that is of a lower priority than the priority attribute of the open temporary object handle request, wherein the invalidating of the any other existing temporary handle(s) allows the application associated with the open temporary object handle request, which is a higher priority request, to proceed.

6. The method as claimed in claim 1, wherein the handle identifies an open file and whether the open file was opened for read or write.

7. The method as claimed in claim 1, further comprising:
    in response to the resource manager invalidating the handle:
        flagging the handle as closed; and
        unchaining the handle from the handle control block; and
    in response to the application explicitly closing the handle, releasing the handle control block.

8. The method as claimed in claim 1, wherein the handle control block remains on the resource manager with a closed flag after the handle is closed by the resource manager.

9. The method as claimed in claim 1, further comprising:
    referencing the handle with a connection control block, wherein the connection control block references one or more handles including the handle associated with a connection, wherein the connection control block still references the handle remains after the handle control block is invalidated.

10. The method as claimed in claim 1, wherein the handle is a Unix file handle.

11. The method as claimed in claim 1, wherein:
    the temporary handle includes a MQOO_OPEN_TEMPORARY option that indicates, in a WebSphere Message Queue (MQ) messaging Environment, that the application is able to cope with the resource object being made unavailable; and
    the sending the response to the request from the application that indicates to the application that the handle has been invalidated further comprises returning a MQRC_TEMPORARY_HANDLE_INVALIDATED return code to the application that indicates the handle has been invalidated.

12. The method as claimed in claim 1, wherein a CreateFile service of an operating system environment is extended to extend a FILE_SHARE_TEMPORARY_HANDLE option to a CreateFile request which identifies a handle associated with the CreateFile request as being a temporary object handle.

13. A computer-implemented method for using a temporary object handle by an application, the method comprising:
    the application issuing a request for a handle to be opened on a resource object that is managed by a resource manager, wherein the handle is an opaque reference that identifies the resource object;
    the application electing that the handle to be opened on the resource object is a temporary object handle, wherein the temporary object handle is subject to being asynchronously invalidated by the resource manager at any time, wherein any application requesting a temporary object handle for a particular resource object is able to cope with the particular resource object being made unavailable; wherein in response to the resource manager receiving the request and the election for the handle from the application, the resource manager allocates a handle control block at the resource manager for the resource object, wherein the handle control block includes an indication that the handle is a temporary object handle;

in response to the application sending a utilization request to the resource manager to use the handle after the handle has been invalidated by the resource manager, the application receiving a response to the utilization request from the resource manager that indicates the handle has been invalidated; and in response to receiving the response from the resource manager that indicates the handle has been invalidated, the application issuing a new request to the resource manager for a second handle to be opened on the resource object.

14. The method as claimed in claim 13, further comprising:
in response to the resource manager making the resource object unavailable, the application receiving a handle invalidated response from the resource manager.

15. The method as claimed in claim 13, wherein:
all requests to open a handle on the resource object include a priority attribute; and
the resource manager invalidates any existing temporary object handle(s) on the resource object having an associated priority attribute that is of a lower priority than a priority attribute of the request by the application, wherein the invalidating the any existing temporary object handle(s) allows the application to proceed in utilizing the resource object.

16. The method as claimed in claim 13, wherein:
the handle identifies an open file and whether the open file was opened for read or write; and
the handle control block remains on the resource manager with a closed flag after the handle is closed by the resource manager.

17. The method as claimed in claim 13, wherein the resource manager references the handle with a connection control block, wherein the connection control block references one or more handles including the handle associated with a connection, wherein the connection control block still references the handle remains after the handle control block is invalidated.

18. The method as claimed in claim 13, wherein the handle is a Unix file handle.

19. The method as claimed in claim 7, wherein:
the temporary handle includes a MQOO_OPEN_TEMPORARY option that indicates, in a WebSphere Message Queue (MQ) messaging Environment, that the application is able to cope with the resource object being made unavailable; and
receiving the response from the resource manager further comprises receiving a MQRC_TEMPORARY_HANDLE_INVALIDATED return code from the resource manager that indicates the handle has been invalidated.

20. The method as claimed in claim 13, wherein a CreateFile service of an operating system environment is extended to extend a FILE_SHARE_TEMPORARY_HANDLE option to a CreateFile request which identifies a handle associated with the CreateFile request as being a temporary object handle.

* * * * *